(12) United States Patent
Kim

(10) Patent No.: US 11,868,739 B2
(45) Date of Patent: Jan. 9, 2024

(54) DEVICE AND METHOD FOR PROVIDING APPLICATION TRANSLATION INFORMATION

(71) Applicant: SAMSUNG ELECTRONICS CO., LTD., Suwon-si (KR)

(72) Inventor: Jiwan Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 502 days.

(21) Appl. No.: 17/270,655

(22) PCT Filed: Sep. 19, 2019

(86) PCT No.: PCT/KR2019/012138
§ 371 (c)(1),
(2) Date: Feb. 23, 2021

(87) PCT Pub. No.: WO2020/060223
PCT Pub. Date: Mar. 26, 2020

(65) Prior Publication Data
US 2021/0224491 A1    Jul. 22, 2021

(30) Foreign Application Priority Data
Sep. 19, 2018   (KR) .................. 10-2018-0112377

(51) Int. Cl.
*G06F 40/58* (2020.01)
*G06N 20/00* (2019.01)

(52) U.S. Cl.
CPC .......... *G06F 40/58* (2020.01); *G06N 20/00* (2019.01)

(58) Field of Classification Search
CPC ................................ G06F 40/58; G06N 20/00
See application file for complete search history.

(56) References Cited

U.S. PATENT DOCUMENTS 9,195,651 B2    11/2015 Luo et al.
2007/0282594 A1* 12/2007 Spina .................. G06F 40/58
                                                        704/9

(Continued)

FOREIGN PATENT DOCUMENTS

JP    2003-036163    2/2003
JP    2016-110446    6/2016

(Continued)

OTHER PUBLICATIONS

Search Report and Written Opinion dated Jan. 8, 2020 in counterpart International Patent Application No. PCT/KR2019/012138.

(Continued)

*Primary Examiner* — Ibrahim Siddo
(74) *Attorney, Agent, or Firm* — Nixon & Vanderhye, P.C.

(57) ABSTRACT

The disclosure relates to an artificial intelligence (AI) system that simulates functions such as cognition and judgment of the human brain by utilizing machine learning algorithms such as deep learning and its applications.
A method in which a device provides translation information of an application includes obtaining a resource file of an application through an operating system (OS) of the device; translating text to be displayed on an execution screen of the application from the obtained resource file by using an artificial intelligence model; generating the execution screen of the application by using the resource file and the translated text; and displaying the generated execution screen, wherein the translating includes translating the text of a first language into a second language by applying at least a part of data in the resource file to the artificial intelligence model trained to translate the text to be displayed on the execution screen of the application.

15 Claims, 16 Drawing Sheets

(56) References Cited

U.S. PATENT DOCUMENTS

| | | | |
|---|---|---|---|
| 2009/0204385 A1 | 8/2009 | Cheng et al. | |
| 2010/0030549 A1* | 2/2010 | Lee | G06F 3/0482 |
| | | | 704/4 |
| 2011/0029103 A1 | 2/2011 | Mann et al. | |
| 2014/0222413 A1 | 8/2014 | Rossmann | |
| 2014/0372098 A1 | 12/2014 | Arseniev et al. | |
| 2018/0181922 A1 | 6/2018 | Choi et al. | |

FOREIGN PATENT DOCUMENTS

| | | |
|---|---|---|
| KR | 10-2015-0130476 | 11/2015 |
| KR | 10-1695396 | 1/2017 |
| KR | 10-2018-0074567 | 7/2018 |

OTHER PUBLICATIONS

Office Action dated Mar. 22, 2023 in counterpart Korean Patent Application No. 10-2018-0112377 and English-language translation.

\* cited by examiner

DEVICE AND METHOD FOR PROVIDING APPLICATION TRANSLATION INFORMATION

This application is the U.S. national phase of International Application No. PCT/KR2019/012138 filed 19 Sep. 2019, which designated the U.S. and claims priority to KR Patent Application No. 10-2018-0112377 filed 19 Sep. 2018, the entire contents of each of which are hereby incorporated by reference.

TECHNICAL FIELD

The present disclosure relates to a device and a method for providing translation information of an application, and more particularly, to a device and a method for translating text in an execution screen of an application by using an artificial intelligence model.

BACKGROUND ART

An artificial intelligence (AI) system is a computer system with human level intelligence. Unlike an existing rule-based smart system, the AI system is a system that trains itself autonomously, makes decisions, and becomes increasingly smarter. The more the AI system is used, the more the recognition rate of the AI system may improve and the AI system may more accurately understand a user preference. Thus, existing rule-based smart systems have been gradually replaced by deep learning based AI systems.

AI technology refers to machine learning (deep learning) and element technologies that utilize the machine learning.

Machine learning is an algorithm technology that classifies/learns the features of input data autonomously. Element technology is a technology that utilizes a machine learning algorithm such as deep learning and includes technical fields such as linguistic understanding, visual comprehension, reasoning/prediction, knowledge representation, and motion control.

AI technology is applied to various fields as follows. Linguistic understanding is a technology to identify and apply/process human language/characters and includes natural language processing, machine translation, dialogue systems, query response, speech recognition/synthesis, and the like. Visual comprehension is a technology to recognize and process objects like human vision and includes object recognition, object tracking, image search, human recognition, scene understanding, spatial understanding, image enhancement, and the like. Reasoning prediction is a technology to obtain and logically infer and predict information and includes knowledge/probability based reasoning, optimization prediction, preference based planning, recommendation, and the like. Knowledge representation is a technology to automate human experience information into knowledge data and includes knowledge building (data generation/classification), knowledge management (data utilization), and the like. Motion control is a technology to control autonomous traveling of a vehicle and motion of a robot, and includes motion control (navigation, collision avoidance, and traveling), operation control (behavior control), and the like.

Meanwhile, when an application installed in a device does not provide translation data of a predetermined language, the device needs to effectively translate text in an execution screen of the application.

DESCRIPTION OF EMBODIMENTS

Technical Problem

Provided are a device and a method for translating text in an application in an operation system of the device using an artificial intelligence model.

Provided are a device and a method for generating an execution screen of an application including text translated into a certain language when the application does not provide translation data of the predetermined language.

Provided are a device and a method for effectively training and using an artificial intelligence model for translating text in an application.

BEST MODE

Figure 1:
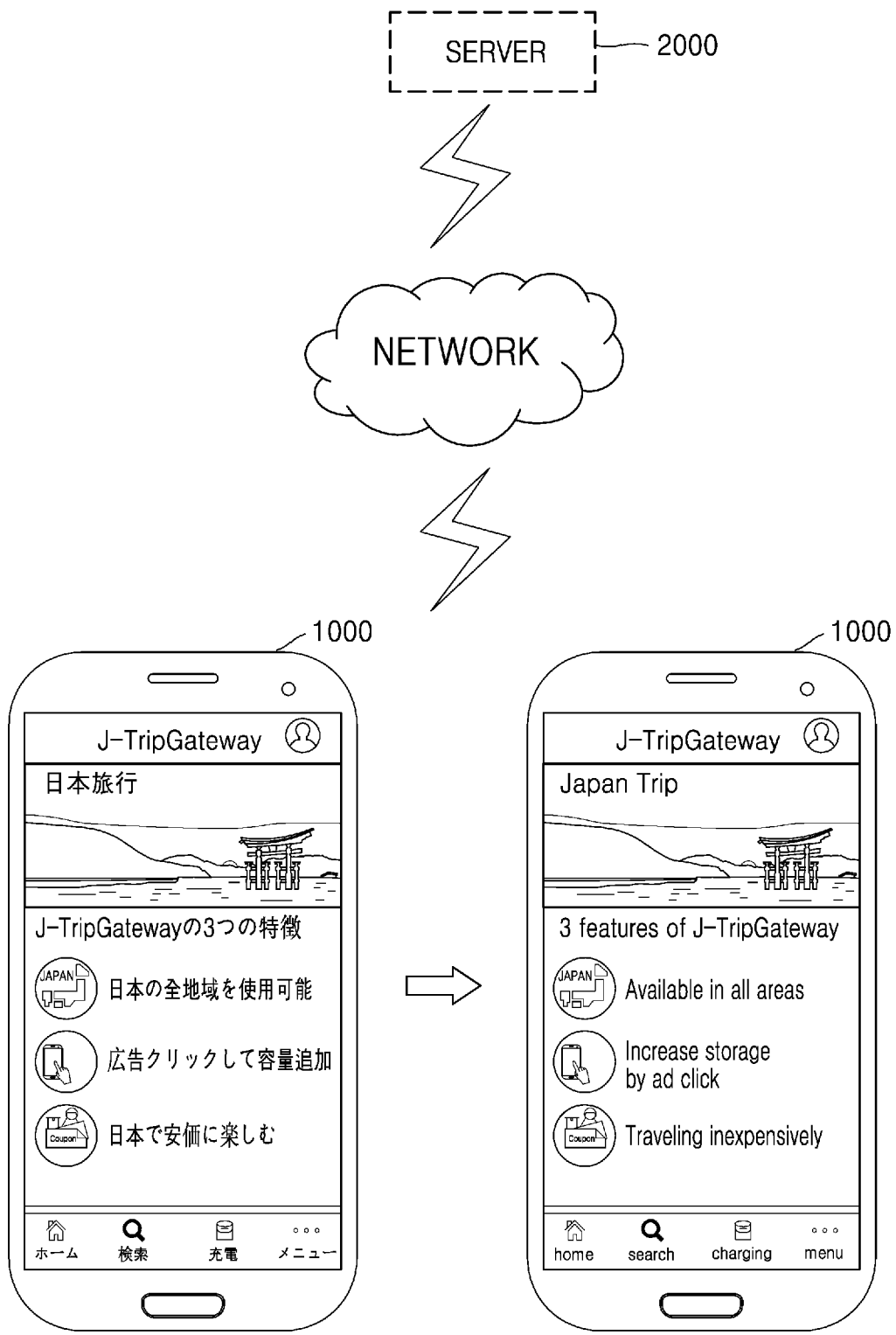
FIG. 1 is a diagram illustrating a system for translating text in an application installed on a device, according to some embodiments.

According to an aspect of the present disclosure, a method in which a device provides translation information of an application includes receiving a user input for executing the application installed in the device; obtaining a resource file of the application through an operating system (OS) of the device in response to the user input; translating text to be displayed on an execution screen of the application using an artificial intelligence model and the obtained resource file; generating the execution screen of the application by using the resource file and the translated text; and displaying the generated execution screen, wherein the translating includes translating the text of a first language into a second language by applying at least a part of data in the resource file to the artificial intelligence model trained to translate the text to be displayed on the execution screen of the application.

According to another aspect of the present disclosure, a device for providing translation information of an application includes a display; a memory; and a processor configured to control the display and the memory, wherein the processor is further configured to receive a user input with respect to the application to be executed in the device, obtain a resource file of the application through an operating system (OS) of the device in response to the user input, translate text to be displayed on an execution screen of the application using an artificial intelligence model and the obtained resource file, generate the execution screen of the application by using the resource file and the translated text, and display the generated execution screen, and wherein the processor is further configured to translate the text of a first language into a second language by applying at least a part of data in the resource file to the artificial intelligence model trained to translate the text to be displayed on the execution screen of the application.

According to another aspect of the present disclosure, a computer program device including a computer-readable recording medium having recorded thereon a program for executing the method on a computer is provided.

MODE OF DISCLOSURE

Hereinafter, embodiments of the disclosure will be described in detail with reference to the accompanying drawings such that those of ordinary skill in the technical field to which the disclosure pertains may readily implement the embodiments of the disclosure. However, the disclosure may be implemented in various different forms and is not limited to the embodiments described herein. To clearly describe the disclosure, parts irrelevant to the description will be omitted in the drawings, and like elements will be designated by like numerals throughout the specification.

Throughout the specification, when an element is referred to as being "connected to" another element, the element may be "directly connected to" the other element or be "electrically connected to" the other element via an intervening element. The terms "comprises", "comprising", "includes" and/or "including", when used herein, specify the presence of stated elements, but do not preclude the presence or addition of one or more other elements.

Hereinafter, the disclosure will be described in detail with reference to the accompanying drawings.

FIG. 1 is a diagram illustrating a system for translating text in an application installed on a device 1000 according to some embodiments.

Referring to FIG. 1, the system for translating the text in the application may include the device 1000 and a server 2000.

The device 1000 may execute the application installed in the device 1000 and display an execution screen of the executed application. The application may include the text in a first language, and a second language may be set as a default language in the device 1000. In this case, an operating system of the device 1000 may analyze a resource file of the application at an application program interface (API) level, thereby translating the text to be displayed on the execution screen of the application into the second language.

The device 1000 may use at least one artificial intelligence model trained based on an artificial intelligence algorithm to translate the text in the execution screen of the application. The device 1000 may translate the text in the execution screen of the application by applying the resource file or various kinds of information obtained from the resource file to the artificial intelligence model.

The artificial intelligence model may be provided by the device 1000 or the server 2000. The artificial intelligence model may be stored as software in a memory in the device 1000 or may be implemented by a hardware processor in the device 1000. Alternatively, the artificial intelligence model may be stored as software in a memory in the server 2000 or implemented by the hardware processor in the device 1000.

The device 1000 may be a smartphone, a tablet PC, a PC, a smart TV, a mobile phone, a personal digital assistant (PDA), a laptop, a media player, a micro server, a global positioning system (GPS) device, an e-book terminal, a digital broadcasting terminal, a navigation system, kiosk, an MP3 player, a digital camera, a home appliance, another mobile or non-mobile computing device, but is not limited thereto. In addition, the device 1000 may be a wearable device such as a watch, glasses, a hair band, and a ring having a communication function and a data processing function. However, the embodiments are not limited thereto, and the device 1000 may include all types of devices capable of installing and executing applications.

A network includes a local area network (LAN), a wide area network (WAN), a value added network (VAN), a mobile radio communication network, a satellite communication network, and a combination thereof, is a data communication network in a comprehensive sense that enables each network member shown in FIG. 1 to communicate with each other smoothly, and may include a wired Internet, a wireless Internet, and a mobile wireless communication network. Wireless communication may include, for example, wireless LAN (Wi-Fi), Bluetooth, Bluetooth low energy, Zigbee, Wi-Fi Direct (WFD), ultra wideband (UWB), infrared Data Association (IrDA), Near Field Communication (NFC), and the like, but is not limited thereto.

Functions related to artificial intelligence according to the disclosure operate through a processor and a memory. The processor may include one processor or a plurality of processors. In this case, one processor or a plurality of processors may be a general-purpose processor such as a CPU, AP, or a digital signal processor (DSP), a graphics-only processor such as a GPU, a vision processing unit (VPU), or an artificial intelligence processor such as an NPU. One processor or a plurality of processors control to process input data according to a predefined operation rule or an artificial intelligence model stored in a memory. Alternatively, when one processor or a plurality of processors are dedicated artificial intelligence processors, the artificial intelligence dedicated processor may be designed with a hardware structure specialized for processing a specific artificial intelligence model.

The predefined operation rule or the artificial intelligence model is created through training. Here, creating through training means that the basic artificial intelligence model is trained by a learning algorithm using a plurality of training data such that the predefined operation rule or the artificial intelligence model set to perform a wanted characteristic (or purpose) is created. Such training may be performed in the device itself on which artificial intelligence according to the disclosure is performed, or may be performed through a separate server and/or system. Examples of the learning algorithm include supervised learning, unsupervised learning, semi-supervised learning, or reinforcement learning, but are not limited to the above-described examples.

The artificial intelligence model may include a plurality of neural network layers. Each of the plurality of neural network layers has a plurality of weight values and performs a neural network operation through an operation result of a previous layer and operations between a plurality of weights. The plurality of weights of the plurality of neural network layers may be optimized by a training result of the artificial intelligence model. For example, the plurality of weights may be updated to reduce or minimize a loss value or a cost value obtained from the artificial intelligence model during a training process. The artificial neural network may include a deep neural network (DNN), for example, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), or deep Q-Networks, and the like, but is not limited to the above-described example.

Figure 2:
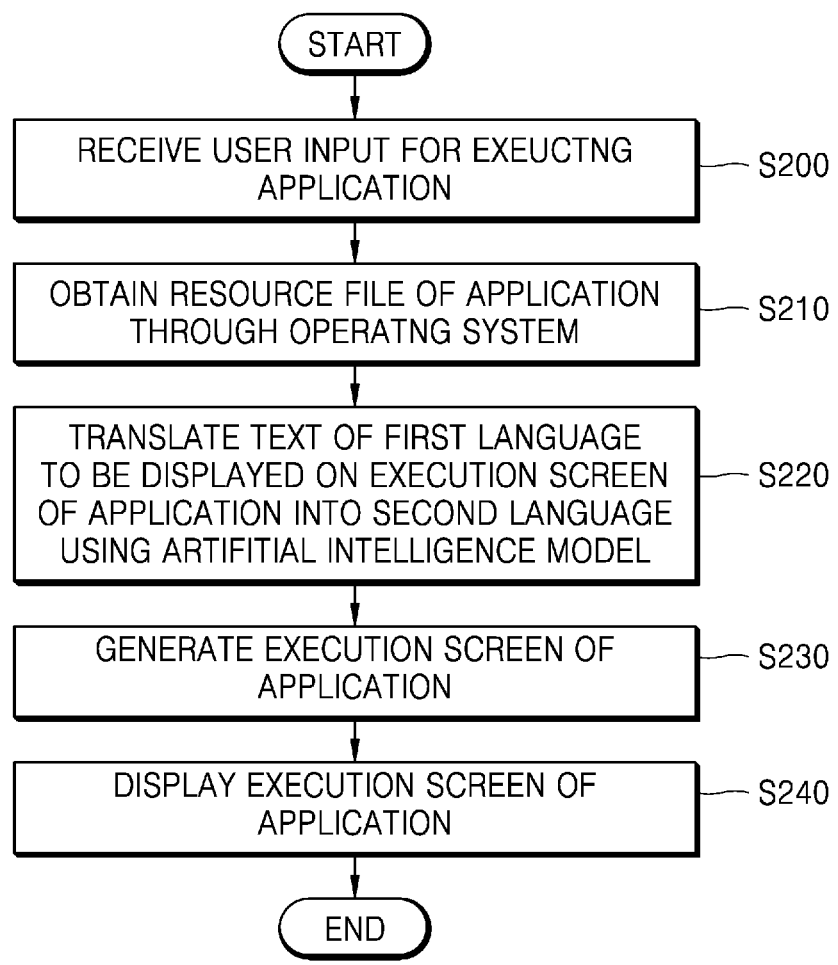
FIG. 2 is a flowchart of a method in which a device translates text to be displayed on an execution screen of an application by using an artificial intelligence model, according to some embodiments.

FIG. 2 is a flowchart of a method in which the device 1000 translates text to be displayed on an execution screen of an application using an artificial intelligence model according to some embodiments.

In operation S200, the device 1000 may receive a user input for executing the application. The device 1000 may receive the user input with respect to the application to be executed in the device 1000. The device 1000 may access an application providing server (not shown) for downloading the application, and may receive the user input for selecting the application to be downloaded from among applications provided by the application providing server (not shown). Alternatively, the device 1000 may receive a user input for installing the application. Alternatively, the device 1000 may receive the user input for selecting the application to be executed from among applications installed in the device 1000. An application installed or to be installed on the device 1000 may have a first language as a default language.

In operation S210, the device 1000 may obtain a resource file of the application through an operating system (OS). The device 1000 may store a resource file of the installed application in a memory (not shown), and access the resource file stored in the memory (not shown) through the OS of the device 1000. Also, the device 1000 may obtain a resource file of the application from the application downloaded from the application providing server (not shown). Also, the device 1000 may obtain the resource file of the application while installing the downloaded application.

Also, before generating the execution screen of the application, the OS of the device 1000 may extract information necessary to configure the execution screen of the application from the resource file of the application. For example, the OS may obtain an image and text to be included in the execution screen of the application from the resource file. In addition, the OS may recognize text in the obtained image.

Also, the OS of the device 1000 may extract various kinds of information necessary for translating text to be displayed on the execution screen of the application from the resource file. For example, the OS of the device 1000 may extract the size of an image to be displayed on the execution screen, a position where the image is to be displayed on the execution screen, a font of the text to be displayed on the execution screen, a font color, a character spacing, a line spacing, a position where the text is to be displayed on the execution screen, and a category of the application. In addition, for example, the OS of the device 1000 may obtain information about a color of the image to be displayed on the execution screen and a type of an object in the image.

In operation S220, the device 1000 may use the artificial intelligence model to translate the text of the first language to be displayed on the execution screen of the application into a second language. The artificial intelligence model may be a learning model trained using an artificial intelligence algorithm to translate text in an application. For example, the artificial intelligence model may be trained using at least one of a machine learning algorithm, a neural network algorithm, a genetic algorithm, a deep learning algorithm, and a classification algorithm.

The OS of the device 1000 may translate the text of the first language to be displayed on the execution screen of the application into the second language by applying at least some of the data obtained in operation S210 to the artificial intelligence model.

In operation S230, the device 1000 may generate the execution screen of the application. The OS of the device 1000 may generate the execution screen of the application using the resource file of the application. For example, the OS of the device 1000 may generate the execution screen of the application as an image at an API level. The OS of the device 1000 may generate the execution screen of the application using information for configuring an execution screen in the resource file and the text of the second language obtained in operation S220. In addition, for example, the OS of the device 1000 may generate the execution screen of the application in consideration of the size of the extracted image, the size of the translated text, the position of the image to be disposed in the execution screen, and the position of the translated text to be disposed in the execution screen. In this case, the device 1000 may determine the translated text and the size of the translated text so as to maintain a layout of the execution screen of the application.

In operation S240, the device 1000 may display the execution screen of the application.

It is described above that the execution screen of the application is generated by using the translated text using the artificial intelligence model, but the embodiments are not limited thereto. The OS of the device 1000 may directly generate the execution screen of the application including the translated text by applying the data obtained in operation S210 to the artificial intelligence model.

Figure 3:
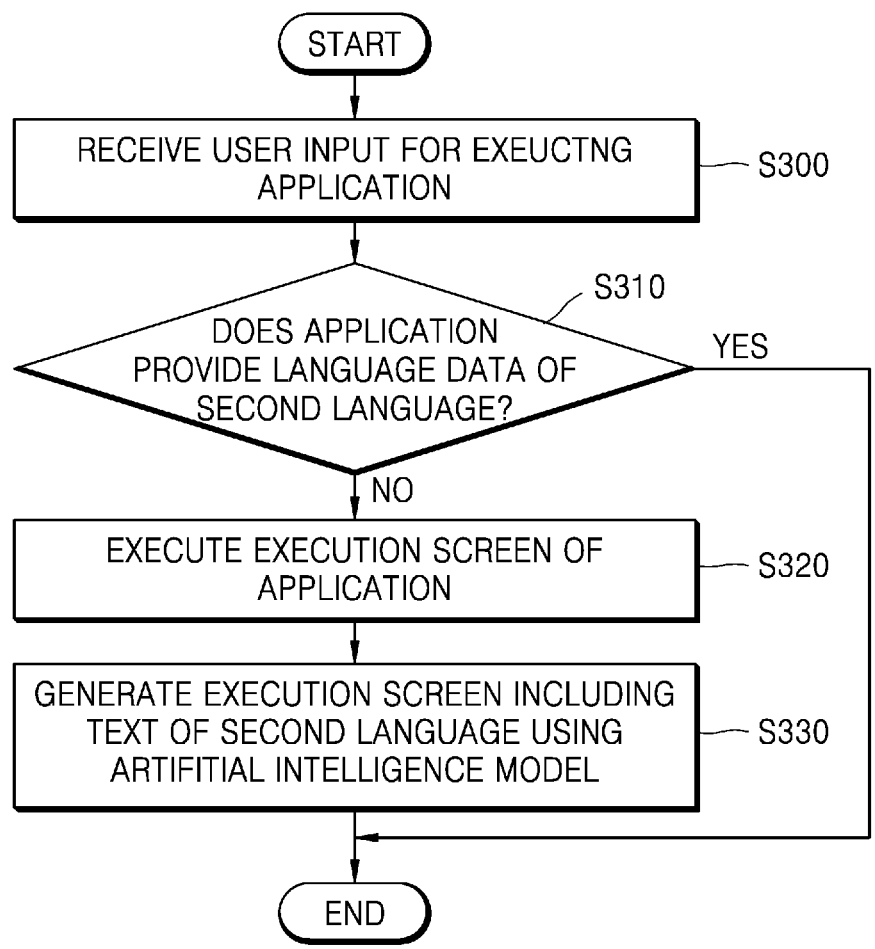
FIG. 3 is a flowchart of a method in which a device performs translation in consideration of whether language data of a second language is provided by an application, according to some embodiments.

FIG. 3 is a flowchart of a method in which the device 1000 performs translation in consideration of whether language data of a second language is provided by an application according to some embodiments.

In operation S300, the device 1000 may obtain a resource file of an application.

In operation S310, the device 1000 may determine whether the application provides the language data of the second language. The operating system of the device 1000 may identify whether the application provides the language data of the second language by analyzing the resource file. In this case, for example, the second language may be a language set as a default language in the device 1000. Alternatively, the second language is a language that a user wants to be translated, and may be a language set based on a user input.

Alternatively, the device 1000 may receive information about whether the application provides the language data of the second language from an application providing server (not shown). In this case, the device 1000 may receive summary information related to the application from the application providing server (not shown), and determine whether the application provides the language data of the second language based on the summary information. In this case, the summary information of the application may be, for example, summary information provided when a certain application is selected from an application list provided by the application providing server (not shown), but is not limited thereto.

In operation S320, the device 1000 may execute an artificial intelligence model. Because the device 1000 determines that the application does not provide the language data of the second language, an OS of the device 1000 may execute the artificial intelligence model. In this case, the artificial intelligence model may be provided by the device 1000 or the server 2000. The artificial intelligence model may be stored as software in a memory in the device 1000 or may be implemented by a hardware processor in the device 1000. Alternatively, the artificial intelligence model may be stored as software in a memory in the server 2000 or implemented by the hardware processor in the device 1000.

In operation S330, the device 1000 may generate an execution screen including text of the second language using the artificial intelligence model. The OS of the device 1000 may apply at least one of an application resource file, data related to a configuration of the execution screen of the application obtained from the resource file, or application information provided from the application providing server (not shown) to the artificial intelligence model.

In addition, the OS of the device 1000 may generate the execution screen of the application including translated text by using the translated text output from the artificial intelligence model. Alternatively, the OS of the device 1000 may obtain the execution screen of the application including the translated text output from the artificial intelligence model.

Meanwhile, the artificial intelligence model may include an artificial intelligence model that provides at least one of a screen analysis function, a text translation function, or a screen generation function. For example, the artificial intelligence model may include a model trained to analyze the execution screen of the application. In this case, information other than information about the configuration of the execution screen obtained from the resource file of the application may be obtained from the artificial intelligence model. In addition, the artificial intelligence model may include a model trained to translate text in the execution screen of the application. In addition, the artificial intelligence model may include a model generated by training criteria for generating an execution screen of the application including the translated text. Criteria as to what data to use to translate the text in the execution screen of the application and how to translate the text using the data may be set. In addition, criteria as to which data to use to generate the execution screen of the application including the translated text and how to generate the execution screen of the application using the data may be set.

Figure 4:
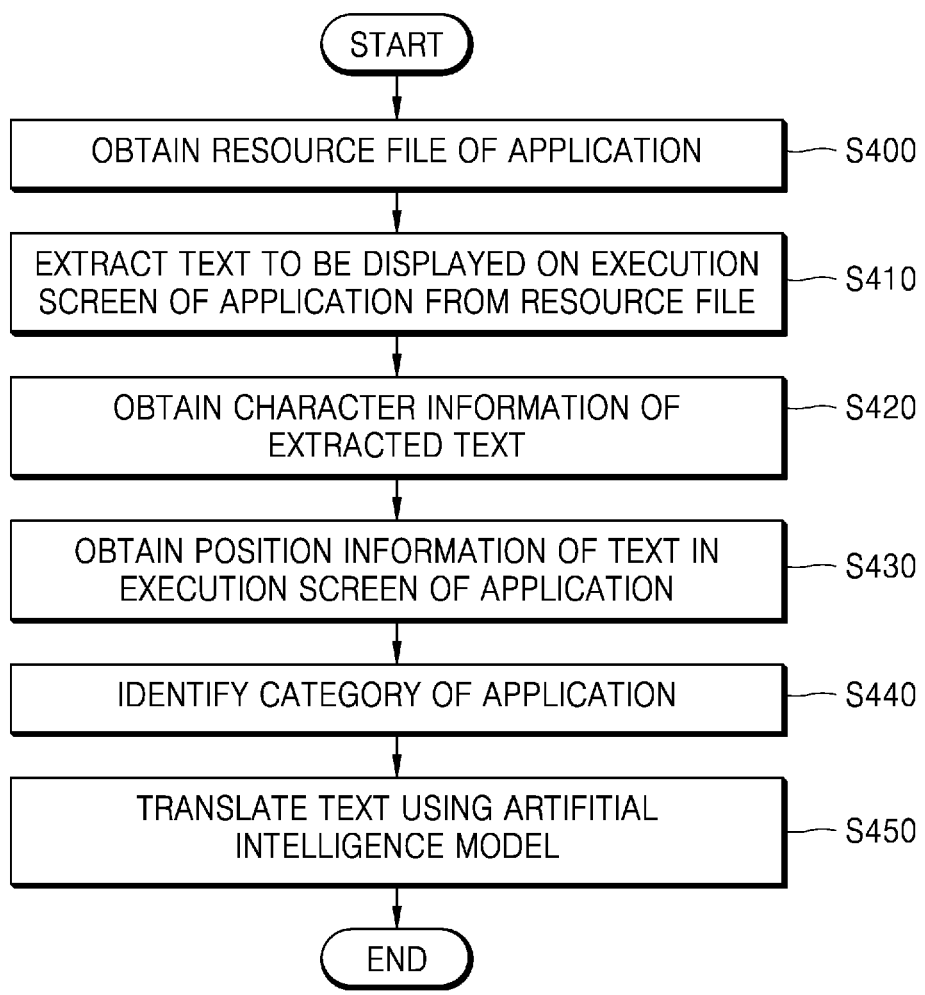
FIG. 4 is a flowchart of a method in which a device obtains data to be applied to an artificial intelligence model, according to some embodiments.

FIG. 4 is a flowchart of a method in which the device 1000 obtains data to be applied to an artificial intelligence model according to some embodiments.

In operation S400, the device 1000 may obtain a resource file of an application.

In operation S410, the device 1000 may extract text to be displayed on an execution screen of the application from the resource file. The device 1000 may extract text to be displayed on the execution screen of the application from information related to a configuration of the execution screen of the application in the resource file. Also, the device 1000 may obtain text in an image by analyzing the image included in the execution screen of the application. In this case, a trained artificial intelligence model may be used to analyze the execution screen of the application. The artificial intelligence model trained to analyze the execution screen of the application may identify text in the execution screen of the application by analyzing the image of the execution screen of the application.

In operation S420, the device 1000 may obtain character information of the extracted text. The device 1000 may extract, for example, information about a font, a font size, a character spacing, a font color, and a line spacing of the text to be displayed on the execution screen of the application from the resource file. When the device 1000 recognizes the text from the image, the device 1000 may identify a font, a font size, a character spacing, a font color, and a line spacing of the text based on a shape of the recognized text.

In operation S430, the device 1000 may obtain position information of the text in the execution screen of the application. The device 1000 may obtain information about a position at which the text is disposed in the execution screen of the application from the resource file. Also, the device 1000 may obtain information about an area of a part where the text is located in the execution screen of the application from the resource file.

When the device 1000 recognizes the text from the image, the device 1000 may extract the information about the position and area of the image in the execution screen from the resource file, and identify the position of the text in the execution screen using the position of the text in the image and the extracted information.

Accordingly, the device 1000 may generate an execution screen translated into a second language while maintaining a layout of the application execution screen of a first language. In addition, the device 1000 may generate the execution screen of the second language having a similar or substantially the same feeling as the execution screen of the application of the first language.

In operation S440, the device 1000 may identify a category of the application. The device 1000 may extract information about the category of the application from the resource file of the application. The device 1000 may receive the information about the category of the application from an application providing server (not shown). The device 1000 may search for the category of the application on the Web using an identification value of the application.

Meanwhile, the device 1000 may collect big data such as age, gender, and hobby of a main user of the application.

In operation S450, the device 1000 may translate the text using the artificial intelligence model. The device 1000 may translate the text to be displayed on the execution screen of the application by inputting at least a part of the information obtained in operations S400 to S440 to the artificial intelligence model.

Meanwhile, the device 1000 may translate the text to be displayed on the execution screen of the application by inputting various kinds of information in addition to the information obtained in operations S400 to S440 to the artificial intelligence model.

In this case, the artificial intelligence model may be selected in consideration of the category of the application, a user profile, etc. For example, the artificial intelligence model used for translation of the text may be trained using language information used in an application in a category similar to the application. In addition, the artificial intelligence model used for translation of the text may be trained to translate the text according to an expression preferred by a main user of the application.

Figure 5:
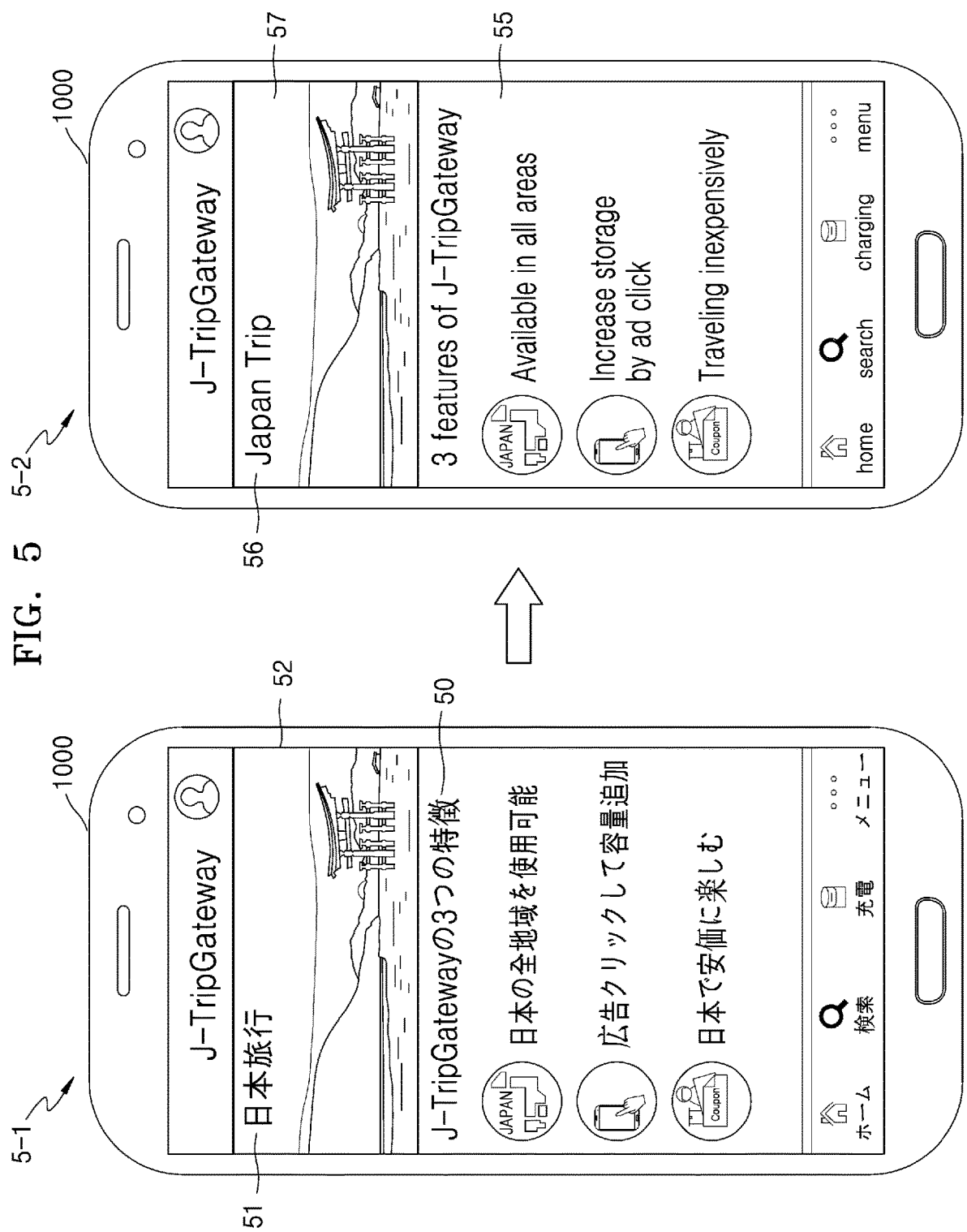
FIG. 5 is a diagram illustrating an example in which text included in an execution screen of an application is translated, according to some embodiments.

FIG. 5 is a diagram illustrating an example in which text included in an execution screen of an application is translated according to some embodiments.

Referring to reference numeral 5-1 of FIG. 5, the execution screen of the application may include texts 50 and 51 of a first language. The text 50 and the image 52 may be displayed on the execution screen of the application, and an image 50 may include a certain text 51.

Referring to reference numeral 5-2 of FIG. 5, the device 1000 may display the execution screen of the application including texts 55 and 56 translated into a second language.

The device 1000 may obtain the text 50, character information of the text 50, and position information of the text 50 from a resource file of the application. In addition, the device 1000 may obtain the text 55 translated into the second language by inputting the obtained text 50, the character information of the text 50, and the position information of the text 50 to an artificial intelligence model. In this case, the text 55 may be translated into the second language in consideration of a position and area on which the text 55 translated into the second language is to be displayed. For example, the text 50 of the first language may be translated into various expressions. The text 50 may translated such that the translated text 55 may be disposed in a region where the text 50 of the first language is disposed in the execution screen of the application.

In addition, the text 55 translated into the second language may have a font having a similar feeling to the text 50 of the first language. In addition, a font, a font size, a character spacing, and a line spacing of the text 55 translated into the second language may be determined in consideration of the position and area on which the text 55 translated into the second language is to be displayed.

Also, the device 1000 may obtain the image 52 from a resource file of the application and recognize the text 51 in the image 52. The device 1000 may obtain character information of the recognized text 51 and position information of the text 51, and input the text 51, the character information of the text 51, and the position information of the text 51 to the artificial intelligence model, thereby obtaining the text 56 translated into the second language. In this case, the text 56 may be translated into the second language in consideration of a position and area on which the text 56 translated into the second language is to be displayed. For example, the text 51 of the first language may be translated into various expressions. The text 52 may translated such that the translated text 56 may be disposed in a region where the text 52 of the first language is disposed in the execution screen of the application.

In addition, the text 56 translated into the second language may have a font having a similar feeling to the text 51 of the first language. In addition, a font, a font size, a character spacing, and a line spacing of the text 56 translated into the second language may be determined in consideration of the position and area on which the text 56 translated into the second language is to be displayed.

Accordingly, the device 1000 may generate the execution screen translated into the second language while maintaining a layout of the execution screen of the application in the first language. In addition, the device 1000 may generate an execution screen of a second language having a similar or substantially the same feeling as the execution screen of the application of the first language.

FIGS. 6 to 10 are diagrams illustrating examples in which the device 1000 uses an artificial intelligence model according to some embodiments.

Figure 6:
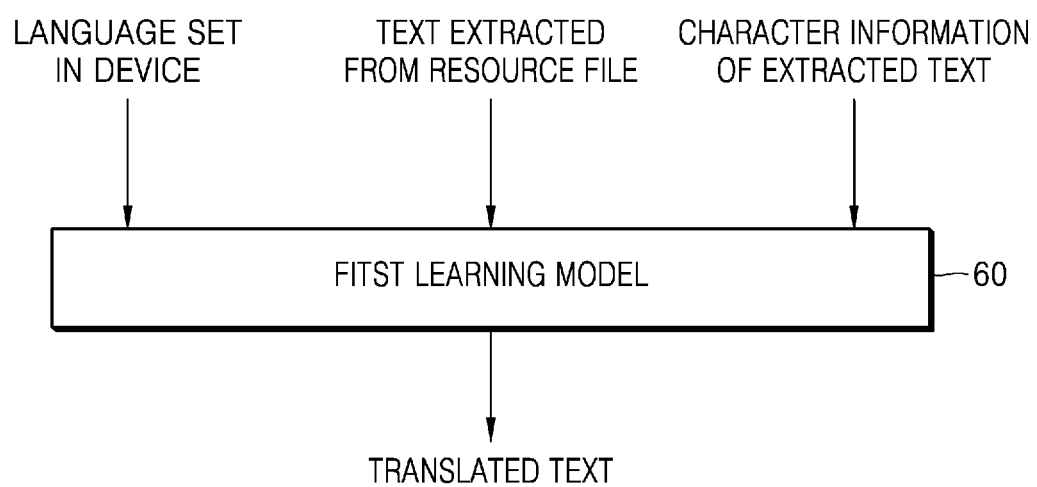
FIGS. 6, 7, 8, 9, and 10 are diagrams illustrating examples in which a device uses an artificial intelligence model, according to some embodiments

Referring to FIG. 6, for example, when a default language set in the device 1000, text extracted from a resource file of an application, and character information of the extracted text are input to a first learning model 60, text translated into a second language may be output. Also, the text output from the first learning model 60 may be used by an OS of the device 1000 to generate an execution screen of an application.

In this case, the default language set in the device 1000 may be the second language. The text translated into the second language may reflect the character information of the text extracted from the resource file, and may have a font, a font size, a font color, and a character spacing having a similar feeling to the text extracted from the resource file.

The first learning model 60 may be an artificial intelligence model trained using an artificial intelligence algorithm so as to translate text in the execution screen of the application. The first learning model 60 may be a model trained by using the default language set in the device 1000, the text extracted from the resource file of the application, and the character information of the extracted text as training data.

Figure 7:
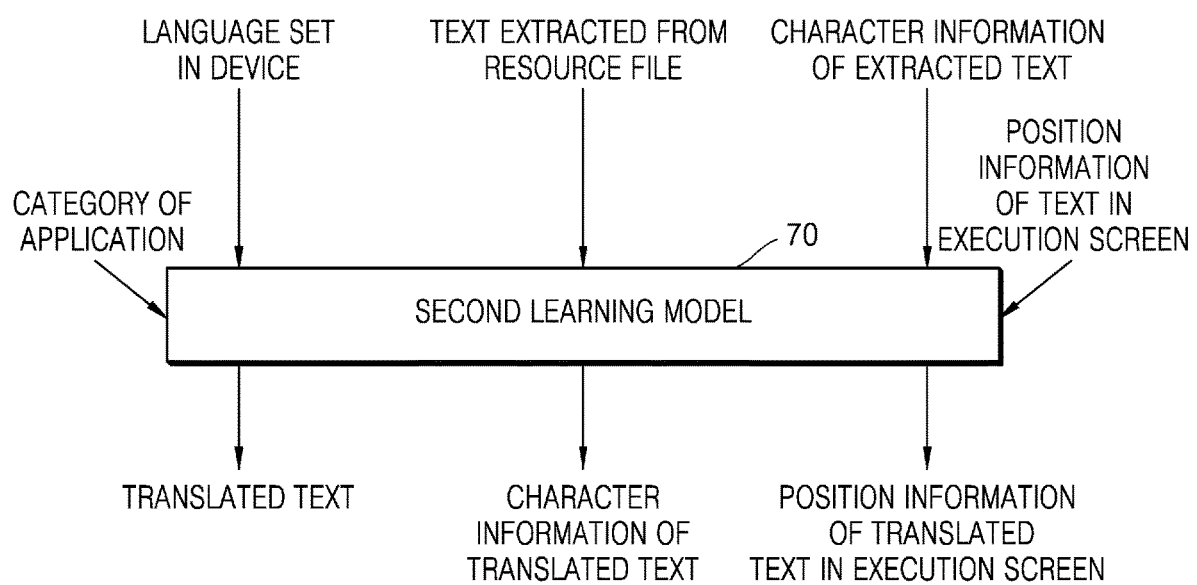

Referring to FIG. 7, for example, when the default language set in the device 1000, the text extracted from the resource file of the application, the character information of the extracted text, a category of the application, and position information of the text in the execution screen are input to a second learning model 70, the text translated into the second language, the character information of the translated text, and the position information in the execution screen of the translated text may be output. Further, the text, the character information, and the position information output from the second learning model 70 may be used by the OS of the device 1000 to generate the execution screen of the application.

In this case, the default language set in the device 1000 may be the second language. The text translated into the second language may reflect the character information of the text extracted from the resource file, the category of the application, and the position information of the text to have a font, a font size, a font color, and a character spacing having a similar feeling to the text extracted from the resource file, and may be displayed on a position similar to the position of the text extracted from the resource file in the execution screen.

In addition, the second learning model 70 may be an artificial intelligence model trained using an artificial intelligence algorithm so as to translate text in the execution screen of the application. The second learning model 70 may be, for example, a model trained by using the default language set in the device 1000, the text extracted from the resource file of the application, the character information of the extracted text, the category of the application, and the position information of text in the execution screen as training data. The second learning model 70 may be, for example, a model trained by using text of the second language used in another application of the same or similar category as the application as training data.

Figure 8:
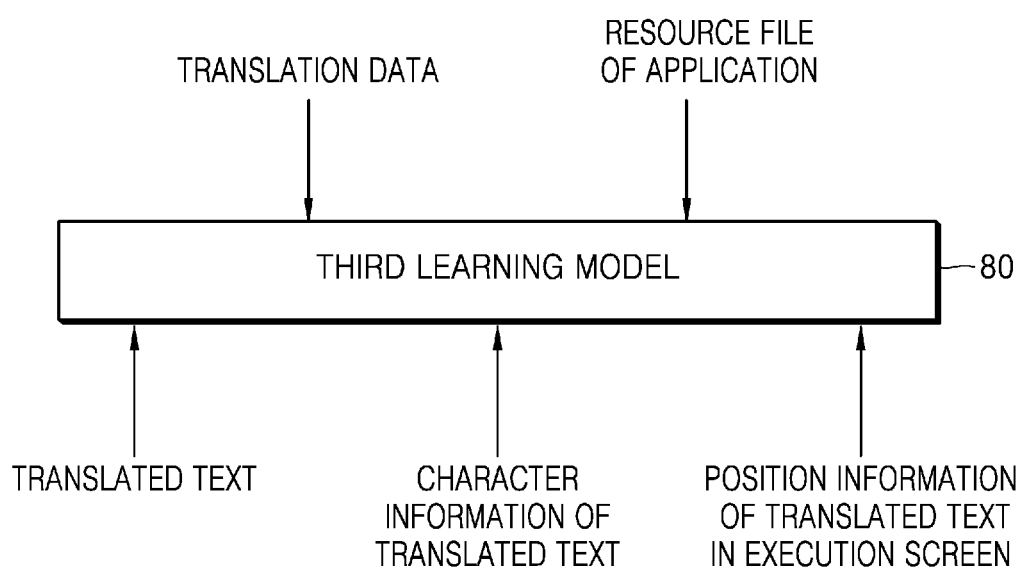

Referring to FIG. 8, for example, when the resource file of the application and translation data are input to a third learning model 80, the text translated into the second language, the character information of the translated text, and the position information of the translated text in the execution screen may be output. The translation data may be language data useful for translation of the text. The translation data may include, for example, text of the second language used in another application in the same or similar category as the category of the application. Also, the translation data may include cumulative data regarding translation contents translated in the same or similar category as the category of the application. The text, the character information, and the position information output from the third learning model 80 may be used by the OS of the device 1000 to generate the execution screen of the application.

In this case, the default language set in the device 1000 may be the second language. The text before translation may be translated into the second language so as to have a similar feeling to the text before translation in the execution screen of the application by reflecting various kinds of information related to a configuration of the execution screen of the application in the resource file.

Also, the third learning model 80 may be an artificial intelligence model trained using an artificial intelligence algorithm so as to translate text in the execution screen of the application. The third learning model 80 may be, for example, a model trained by using the default language set in the device 1000, the resource file of the application, the translation data as training data.

Figure 9:
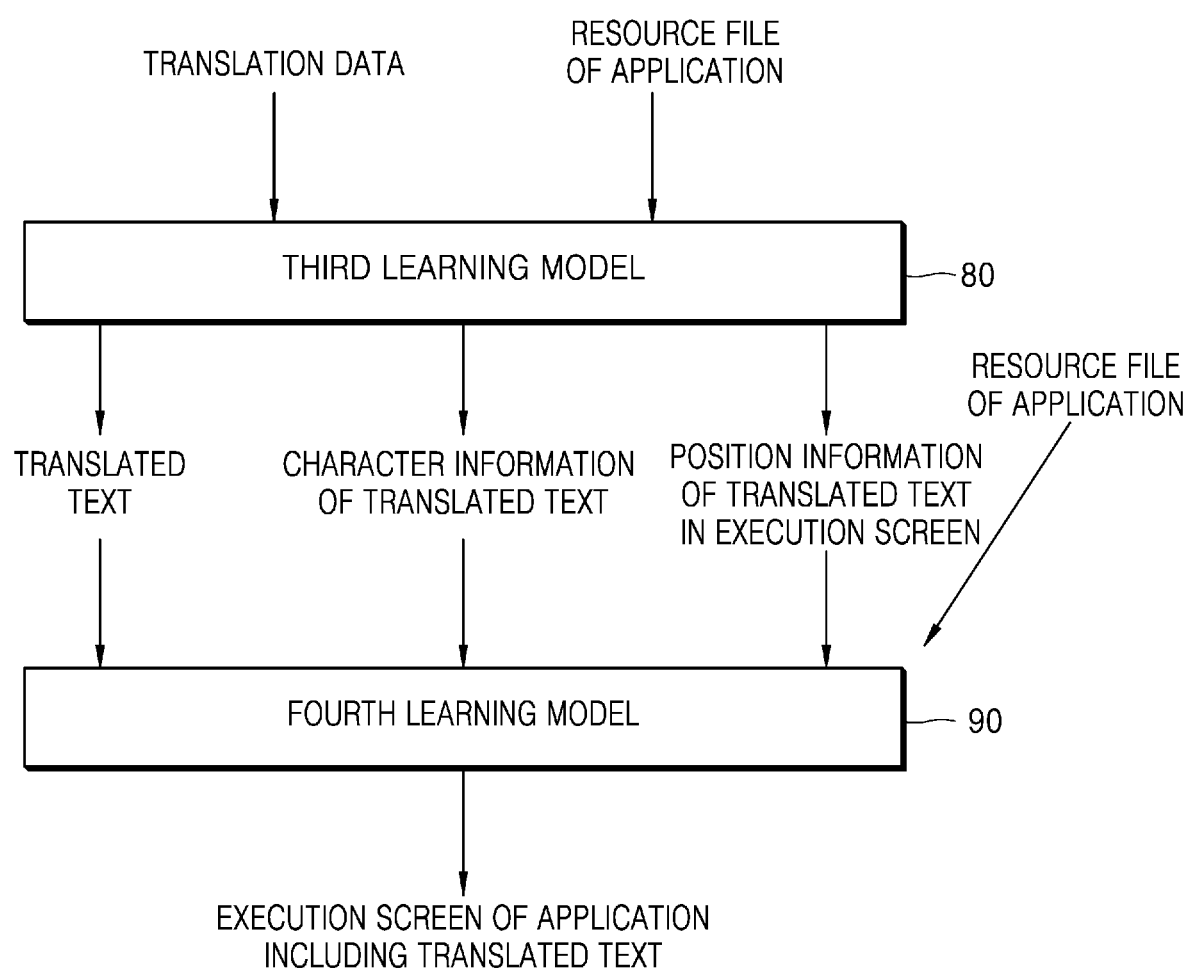

Referring to FIG. 9, when information output from the third learning model 80 (e.g., the text translated into the second language, the character information of the translated text, and the position information of the translated text in the execution screen) and the resource file of the application are input to a fourth learning model 90, an execution screen of the application including the translated text may be output.

The fourth learning model 90 may be an artificial intelligence model trained using an artificial intelligence algorithm so as to generate the execution screen of the application including the translated text. The fourth learning model 90 may be, for example, a model trained by using the resource file of the application, the text translated into the second language, the character information of the translated text, and the position information of the translated text in the execution screen as training data.

Figure 10:
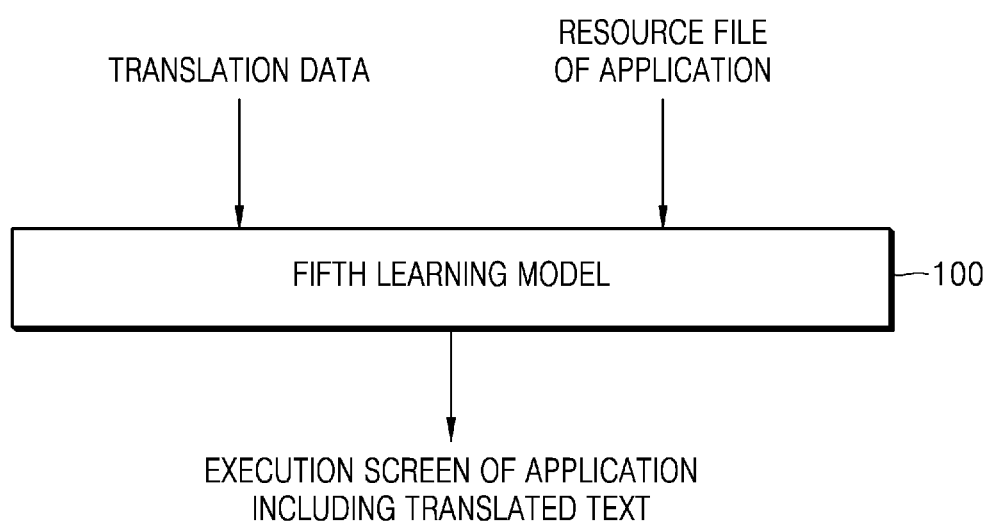

Referring to FIG. 10, when, for example, the resource file of the application and translation data are input to a fifth learning model 100, an execution screen of the application including the text translated into the second language may be displayed. In this case, the fifth learning model 100 may be an artificial intelligence model trained using an artificial intelligence algorithm to translate text in the execution screen of the application and generate the execution screen of the application including the translated text. The fourth learning model 80 may be, for example, a model trained by using the default language set in the device 1000, the resource file of the application, and the translation data as training data.

In FIGS. 6 to 10, examples of translating text or generating an execution screen of an application including the translated text by using various kinds of information other than the text to be translated through various types of learning models are described, but are not limited thereto. Learning models of different types and numbers from the learning models shown in FIGS. 6 to 10 may be used to translate text or generate an execution screen of an application including the translated text. In addition, different and more diverse information may be input to each learning model. Meanwhile, the artificial intelligence model may only provide functions for text translation. In this case, the device 1000 may obtain the translated text by inputting only the text requiring translation to the artificial intelligence model. In addition, the device 1000 may generate the execution screen of the application including the translated text by using various setting information related to the configuration of the execution screen of the application, etc. together with the translated text.

Figure 11:
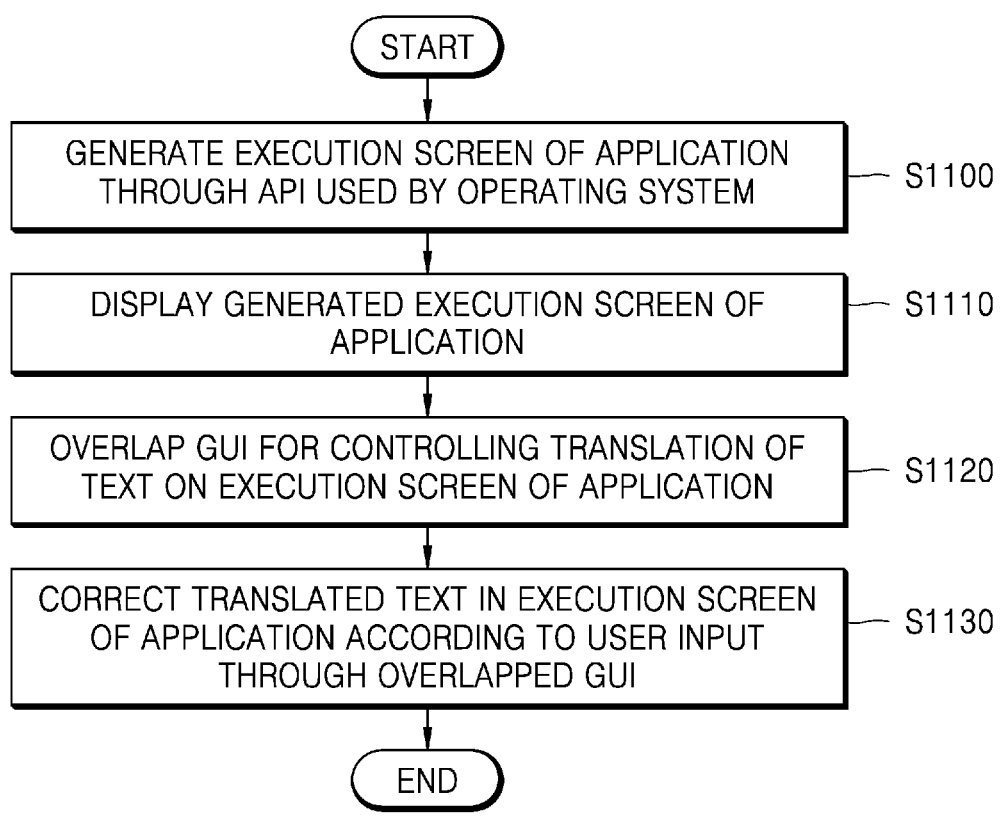
FIG. 11 is a flowchart of a method in which a device provides a graphical user interface (GUI) for controlling the translation of text, according to some embodiments.

FIG. 11 is a flowchart of a method in which the device 1000 provides a graphical user interface (GUI) for controlling the translation of text according to some embodiments.

In operation S1100, the device 1000 may generate an execution screen of an application through an API used by an OS. The device 1000 may configure the execution screen of the application to include a translated text, and may generate the execution screen of the application in an image format. In addition, the device 1000 may set an operation and link information corresponding to a certain object in the execution screen of the application by using a resource file of the application.

In operation S1110, the device 1000 may display the generated execution screen of the application.

In operation S1120, the device 1000 may overlap a GUI for controlling the translation of text on the execution screen of the application. The device 1000 may generate the GUI to correct the translated text in the execution screen of the application, and may overlap and display the generated GUI on the execution screen of the application. The GUI for controlling the translation of text may be provided by an OS of the device 1000 independently of the application.

In operation S1130, the device 1000 may correct the translated text in the execution screen of the application according to a user input through the overlapped GUI. When the user input for correcting the translated text is received through the GUI, the OS of the device 1000 may correct the translated text in the execution screen and correct the execution screen of the application such that the execution screen of the application includes the corrected text.

Figure 12:
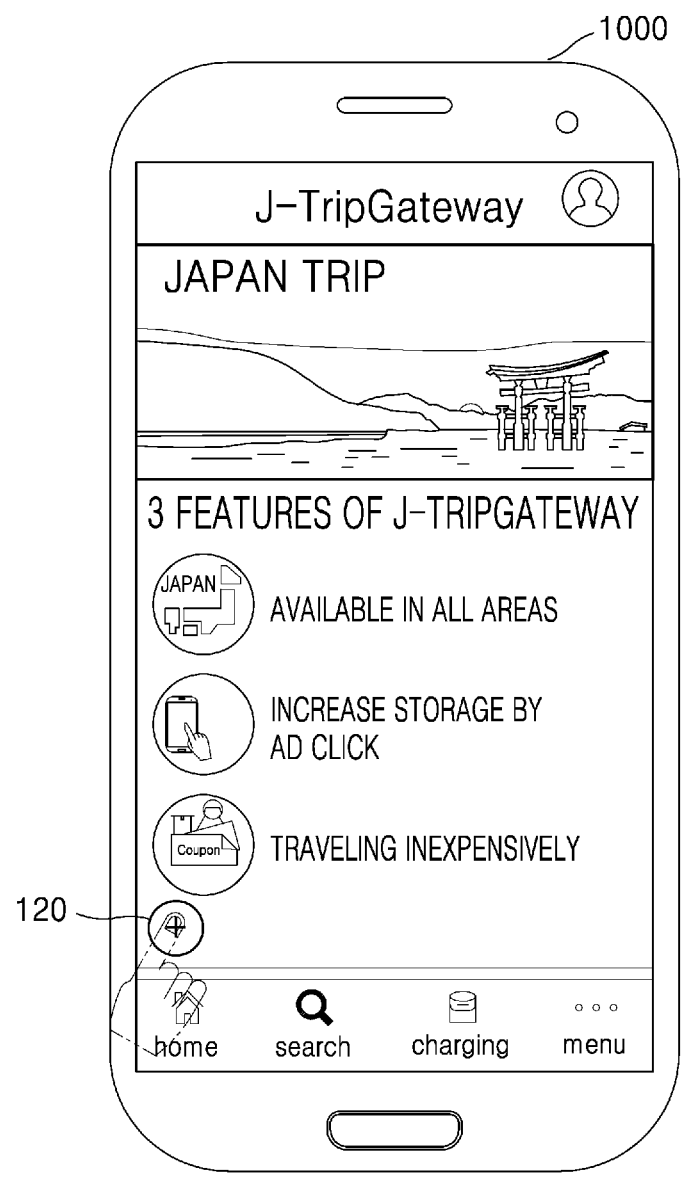
FIGS. 12 and 13 are diagrams illustrating an example in which a device displays a GUI for controlling the translation of text on an execution screen of an application including the translated text, according to some embodiments.
Figure 13:
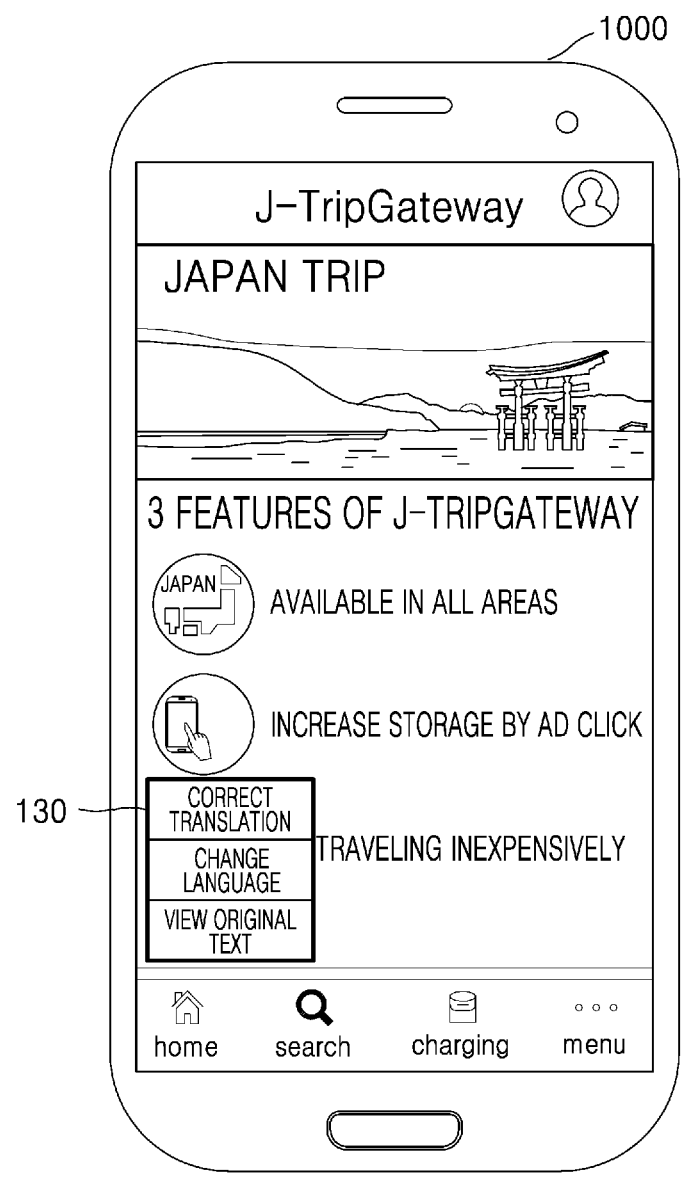

FIGS. 12 and 13 are diagrams illustrating an example in which the device 1000 displays a GUI for controlling the translation of text on an execution screen of an application including the translated text according to some embodiments.

Referring to FIG. 12, a button 120 for calling a menu for controlling the translation of text may be displayed on the execution screen of the application including the translated text. Also, a user of the device 1000 may touch the button 120 to correct the translated text.

Referring to FIG. 13, when a user input touching the button 120 is received, the device 1000 may display a menu 130 for controlling the translation of text. For example, the menu 130 may include an item for correcting the translation, an item for changing a language to be translated, and an item for viewing the original text.

To correct at least a part of the translated text in the execution screen of the application, to translate the translated text in the execution screen of the application into another language, or to view the original text of the translated text in the application execution screen, the user may touch the items in the menu 130.

Figure 14:
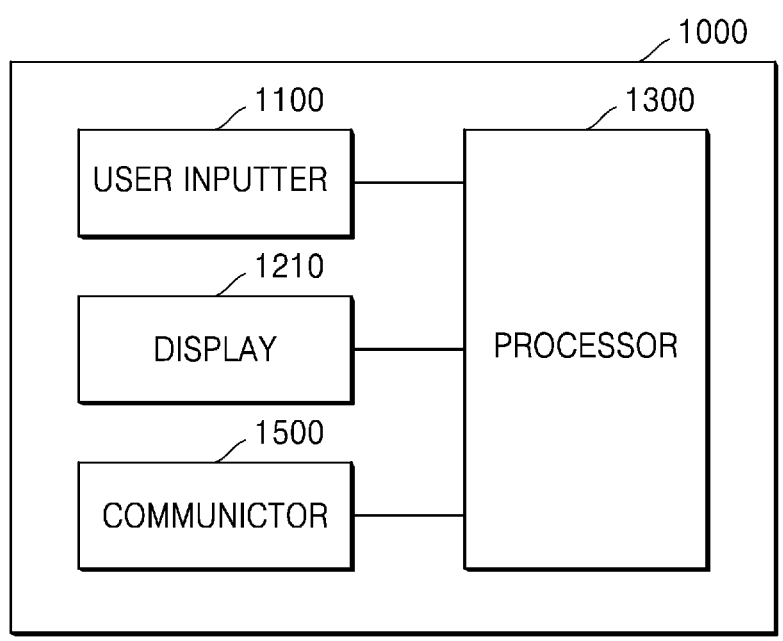
FIGS. 14 and 15 are block diagrams of a device according to some embodiments.
Figure 15:
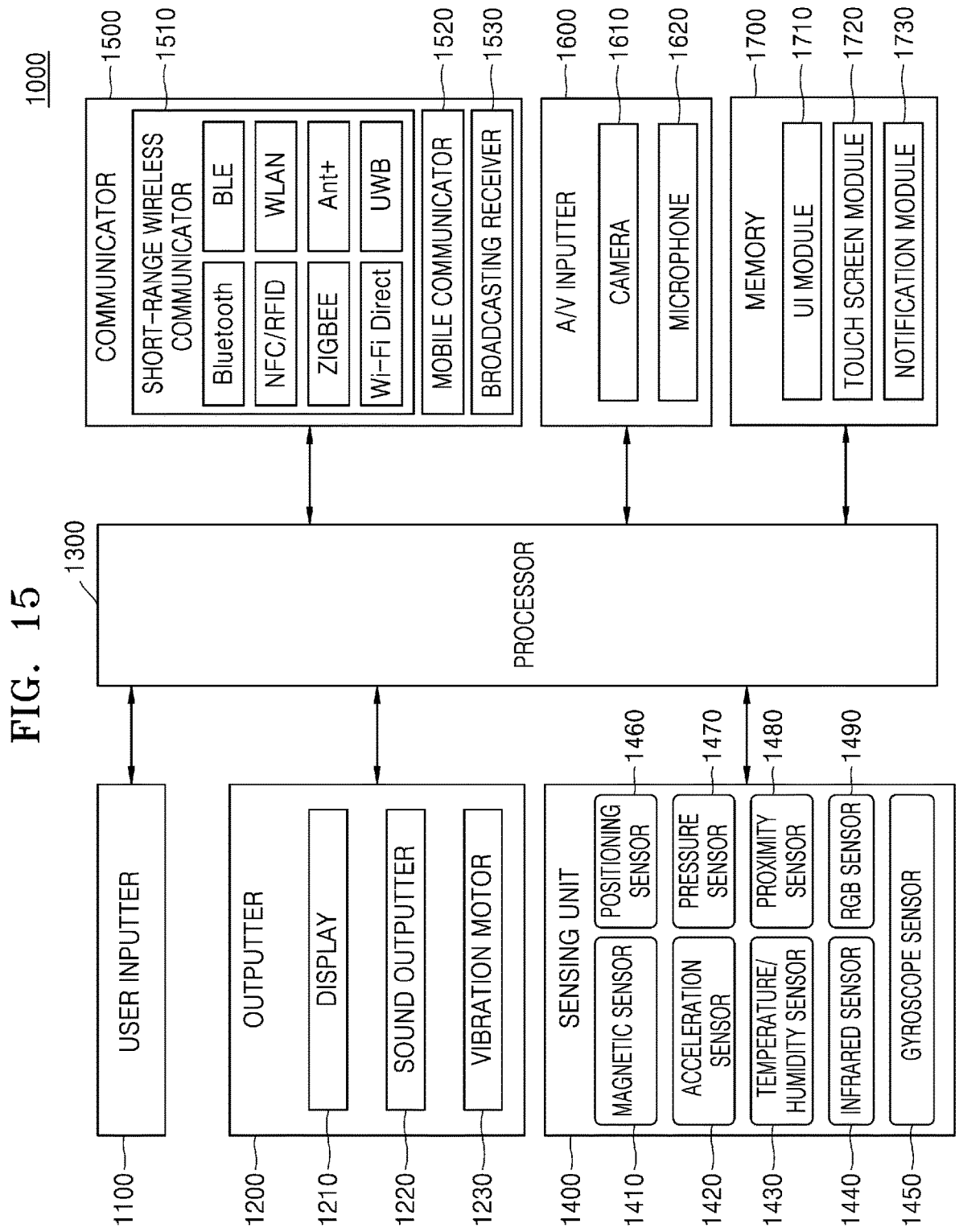

FIGS. 14 and 15 are block diagrams of the device 1000 according to some embodiments.

As shown in FIG. 14, the device 1000 according to some embodiments may include a user inputter 1100, a display 1210, a controller 1300, and a communicator 1500. However, not all of the components shown in FIG. 14 are indispensable components of the device 1000. The device 1000 may be implemented by more components than the components shown in FIG. 14, or the device 1000 may be implemented by fewer components than the components shown in FIG. 14.

For example, as shown in FIG. 14, the device 1000 according to some embodiments may include an outputter 1200, a sensing unit 1400, an A/V inputter 1600, and a memory 1700, in addition to the user inputter 1100, the display 1210, the controller 1300, and the communicator 1500.

The user inputter 1100 refers to a device used by a user to input data for controlling the device 1000. According to an embodiment, the user inputter 1100 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, etc., but is not limited thereto.

The user inputter 1100 may receive a user input for executing an application.

The outputter 1200 may output an audio signal, a video signal, or a vibration signal and may include the display 1210, a sound outputter 1220, and a vibration motor 1230.

The display 1210 displays and outputs information processed by the device 1000. For example, the display 1210 may display an execution screen of the application and a GUI for translating and correcting text in the application.

Meanwhile, when the display 1210 and a touch pad are constructed as a touch screen in a layer structure, the display 1210 may be used as an input device as well as an output device. The display 1210 may include at least one of a liquid crystal display, a thin film transistor-liquid crystal display, an organic light-emitting diode, a flexible display, a 3D display, or an electrophoretic display. According to implementation types of the device 1000, the device 1000 may include two or more displays 1210.

The sound outputter 1220 may output audio data received from the communicator 1500 or stored in the memory 1700. The vibration motor 1230 may output a vibration signal. For example, the vibration motor 1230 may output a vibration signal corresponding to an output of audio data or video data (e.g., call signal reception sound, message reception sound, etc.)

The controller 1300 may control an overall operation of the device 1000. For example, the controller 1300 may control the user inputter 1100, the outputter 1200, the sensing unit 1400, the communicator 1500, and the A/V inputter 1600 by executing the programs stored in the memory 1700. For example, the controller 1300 may control operations of the device 1000 in FIGS. 1 to 12 by executing an OS program stored in the memory 1700. The control unit 1300 may include a processor operating as an artificial intelligence model.

Specifically, the controller 1300 may receive a user input for executing an application. The controller 1300 may receive a certain application from an application providing server (not shown) and install the application in the device 1000, and may receive a user input for executing the installed application. The application installed in the device 1000 may have a first language as a default language.

The controller 1300 may obtain a resource file of the application through the OS. The controller 1300 may store the resource file of the installed application in a memory (not shown), and may access the resource file stored in the memory (not shown) through the OS.

Also, before generating an execution screen of the application using the OS, the controller 1300 may extract information necessary to configure the execution screen of the application from the resource file of the application. For example, the controller 1300 may obtain an image and text to be included in the execution screen of the application from the resource file. Also, the controller 1300 may recognize text in the obtained image.

Also, the controller 1300 may extract various kinds of information necessary for translating text to be displayed in the execution screen of the application from the resource file. For example, the controller 1300 may extract the size of an image to be displayed on the execution screen, a position where the image is to be displayed on the execution screen, a font of the text to be displayed on the execution screen, a font color, a character spacing, a line spacing, a position where the text is to be displayed on the execution screen, and a category of the application. Also, for example, the controller 1300 may obtain information about a color of the image to be displayed on the execution screen and a type of an object in the image.

The controller 1300 may use the artificial intelligence model to translate the text of the first language to be displayed on the execution screen of the application into a second language. The artificial intelligence model may be a learning model trained using an artificial intelligence algorithm to translate text in an application. For example, the artificial intelligence model may be trained using at least one of a machine learning algorithm, a neural network algorithm, a genetic algorithm, a deep learning algorithm, and a classification algorithm.

The controller 1300 may translate the text of the first language to be displayed on the execution screen of the application into the second language by applying at least some of the data obtained in relation to the application to the artificial intelligence model.

The controller 1300 may generate the execution screen of the application. The controller 1300 may generate the execution screen of the application using the resource file of the application. For example, the controller 1300 may generate the execution screen of the application as an image at an API level. The controller 1300 may generate the execution screen of the application using information for configuring an execution screen in the resource file and the obtained text of the second language. In addition, for example, the controller 1300 may generate the execution screen of the application in consideration of the size of the extracted image, the size of the translated text, the position of the image to be disposed in the execution screen, and the position of the translated text to be disposed in the execution screen.

The controller 1300 may display the execution screen of the application.

It is described above that the execution screen of the application is generated by using the translated text using the artificial intelligence model, but the embodiments are not limited thereto. The controller 1300 may directly generate the execution screen of the application including the translated text by applying the obtained data to the artificial intelligence model.

Meanwhile, the controller 1300 may determine whether the application provides the language data of the second language. The controller 1300 may identify whether the application provides the language data of the second language by analyzing the resource file. In this case, for example, the second language may be a language set as the default language in the device 1000. Alternatively, the second language is a language that a user wants to be translated, and may be a language set based on a user input.

The controller 1300 may execute an artificial intelligence model. Because the device 1000 determines that the application does not provide the language data of the second language, the controller 1300 may execute the artificial intelligence model. In this case, the artificial intelligence model may be provided by the device 1000 or the server 2000.

The controller 1300 may generate an execution screen including text of the second language using the artificial intelligence model. The controller 1300 may apply at least one of an application resource file, data related to a configuration of the execution screen of the application obtained from the resource file, or application information provided from the application providing server (not shown) to the artificial intelligence model.

In addition, the controller 1300 may generate the execution screen of the application including translated text by using the translated text output from the artificial intelligence model. Alternatively, the controller 1300 may obtain the execution screen of the application including the translated text output from the artificial intelligence model.

Meanwhile, the controller 1300 may generate the execution screen of the application through an API used by the OS. The controller 1300 may configure the execution screen of the application to include a translated text, and may generate the execution screen of the application in an image format. In addition, the controller 1300 may set an operation and link information corresponding to a certain object in the execution screen of the application by using the resource file of the application.

The controller 1300 may overlap a GUI for controlling the translation of text on the execution screen of the application. The controller 1300 may generate the GUI to correct the translated text in the execution screen of the application, and may overlap and display the generated GUI on the execution screen of the application. The GUI for controlling the translation of text may be provided by the OS of the device 1000 independently of the application.

The controller 1300 may correct the translated text in the execution screen of the application according to a user input through the overlapped GUI. When the user input for correcting the translated text is received through the GUI, the controller 1300 may correct the translated text in the execution screen and correct the execution screen of the application such that the execution screen of the application includes the corrected text.

The sensing unit 1400 may sense a state of the device 1000 or a state around the device 1000 and may transmit sensed information to the controller 1300.

The sensing unit 1400 may include, but is not limited to, at least one of a magnetic sensor 1410, an acceleration sensor 1420, a temperature/humidity sensor 1430, an infrared sensor 1440, a gyroscope sensor 1450, a positioning sensor (e.g., a global positioning system (GPS)) 1460, a barometric pressure sensor 1470, a proximity sensor 1480, and a red/green/blue (RGB) sensor (or an illuminance sensor) 1490. A function of each sensor may be intuitively construed from a name of each sensor by those of ordinary skill in the art, and thus will not be described in detail.

The communicator 1500 may include one or more elements that enable communication with a server 2000 and another external device. For example, the communicator 1500 may include a short-range wireless communicator 1510, a mobile communicator 1520, and a broadcasting receiver 1530.

The short-range wireless communicator 1510 may include, but is not limited to, a Bluetooth Low Energy (BLE) communicator, a near field communication (NFC) unit, a wireless local area network (WLAN) (WIFI) communicator, a ZigBee communicator, an infrared Data Association (IrDA) communicator, a WIFI Direct (WFD) communicator, an ultra-wideband (UWB) communicator, and an Ant+ communicator.

The mobile communicator 1520 transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The broadcasting receiver 1530 receives a broadcast signal and/or broadcasting-related information from an external source through a broadcasting channel. The broadcasting channel may include a satellite channel and a terrestrial channel. According to implementation examples, the device 1000 may not include the broadcasting receiver 1530.

In addition, the communicator 1500 may transmit/receive information necessary to translate text and generate an execution screen of an application including the translated text with the server 2000.

The A/V inputter 1600 inputs an audio signal or a video signal and may include a camera 1610, a microphone 1620, etc.

The memory 1700 may store a program for processing and control of the processor 1300 and store data input to or output from the device 1000.

The memory 170 may include a storage medium of at least one type of a flash memory type, a hard disk type, a multimedia card micro type, a card type memory (e.g., a secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, or an optical disk.

The programs stored in the memory 1700 may be classified into a plurality of modules depending on a function thereof, e.g., a user interface (UI) module 1710, a touch screen module 1720, a notification module 1730, etc.

Figure 16:
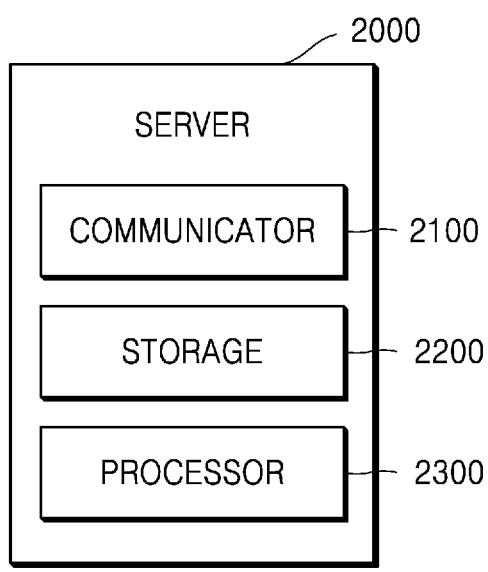
FIG. 16 is a block diagram of a server according to some embodiments.

FIG. 16 is a block diagram of a server 2000 according to some embodiments.

Referring to FIG. 16, the server 2000 according to some embodiments may include a communicator 2100, a storage 2200, and a processor 2300.

The communicator 2100 may include one or more communication modules for communication with the device 1000. For example, the communicator 2100 may include a short-range wireless communicator and a mobile communicator. The short-range wireless communicator may include, but is not limited to, a Bluetooth Low Energy (BLE) communicator, a near field communication (NFC) unit, a wireless local area network (WLAN) (WIFI) communicator, a ZigBee communicator, an infrared Data Association (IrDA) communicator, a WIFI Direct (WFD) communicator, an ultra-wideband (UWB) communicator, and an Ant+ communicator. The mobile communicator transmits and receives a radio signal to and from at least one of a base station, an external terminal, and a server over a mobile communication network. Herein, the radio signal may include various forms of data corresponding to transmission/reception of a voice call signal, a video communication call signal, or a text/multimedia message.

The storage 2200 may store a program for controlling the operation of the server 2000. The storage 2200 may include at least one instruction for controlling the operation of the server 2000. In addition, the storage 2200 may store, for example, an artificial intelligence model for translating text in an application, language data related to text of another application in the same category as a category of the application, data related to characteristics of a major user of the application, and translation history data of the application and other applications. The programs stored in the storage 2200 may be classified into a plurality of modules depending on a function thereof.

The processor 2300 may control an overall operation of the server 2000. For example, the processor 2300 may control the communicator 2100 and the storage 2200 by executing the programs stored in the storage 2200. The processor 2300 may control the operation of the server 2000 of FIGS. 1 to 13 by controlling the communicator 2100 and the storage 2200. Further, the processor 2300 may include a processor operating as an artificial intelligence model.

The processor 2300 may receive information for translating text in an execution screen of an application and information for generating the execution screen of the application including the translated text from the device 1000. In this case, the processor 2300 may obtain transited text or the execution screen of the application including the translated text by applying information for translating the text in the execution screen of the application and/or information for generating the execution screen of the application including the translated text to the artificial intelligence model.

Also, the processor 2300 may apply information about character information of text, a category of the application, a default language of the device 1000, and the attribute of a main user of the application to the artificial intelligence model.

The processor 2300 may provide the device 1000 with the translated text, the character information of the translated text, and information about an arrangement position of the translated text. Alternatively, the processor 2300 may provide the device 1000 with the execution screen of the application including the translated text.

Meanwhile, at least a part of the artificial intelligence model may be managed by the server 2000. In this case, the server 2000 may generate and manage an artificial intelligence model for translating the text in the execution screen of the application or generating the execution screen of the application including the translated text, and the device 1000 may obtain the execution screen of the application including the translated text by using the artificial intelligence model managed by the server 200. For example, the device 1000 may provide information about a text requiring translation to the server 2000, and the server 2000 may provide the information about the translated text to the device 1000. In addition, the device 1000 may display the execution screen of the application including the translated text by using the information about the translated text.

Some embodiments may be embodied in a recording medium including instructions executable by a computer such as a program module executed by the computer. A computer-readable medium may be any usable medium which may be accessed by the computer and includes all volatile/non-volatile and removable/non-removable media. Further, the computer-readable medium may include a computer storage medium. The computer storage medium includes all volatile/non-volatile and removable/non-removable media embodied by a certain method or technology for storing information such as computer-readable instructions, a data structure, a program module or other data. The communication medium may typically include computer readable instructions, data structures, or other data in a modulated data signal such as a program module.

Also, the term "unit" used herein may be a hardware component such as a processor a circuit and/or a software component executed in a hardware component such as a processor.

While the disclosure has been particularly shown and described with reference to embodiments thereof, it will be understood by one of ordinary skill in the art that various changes in form and details may be made therein without departing from the spirit and scope of the disclosure as defined by the following claims. Hence, it will be understood that the embodiments described above are not limiting of the scope of the disclosure. For example, each component described in a single type may be executed in a distributed manner, and components described distributed may also be executed in an integrated form.

The scope of the disclosure is indicated by the claims rather than by the detailed description, and it should be understood that the claims and all modifications or modified forms drawn from the concept of the claims are included in the scope of the disclosure.

What is claimed is:

1. A method in which a device provides translation information of an application, the method comprising:
   receiving a user input with respect to the application to be executed in the device;
   obtaining a resource file of the application through an operating system (OS) of the device in response to the user input;
   translating text to be displayed on an execution screen of the application by using an artificial intelligence model and the obtained resource file;
   generating the execution screen of the application by using the resource file and the translated text; and
   displaying the generated execution screen,
   wherein the translating comprises translating the text of a first language into a second language by applying at least a part of data in the resource file to the artificial intelligence model trained to translate the text to be displayed on the execution screen of the application.

2. The method of claim 1, further comprising:
   in response to the user input, identifying whether the application provides a language file of the second language; and
   calling the artificial intelligence model when it is determined that the language file of the second language is not provided by the application.

3. The method of claim 1, further comprising:
   obtaining the text of the first language from the resource file; and
   obtaining font information of the obtained text, and
   wherein the translating comprises applying the obtained text and the font information to the artificial intelligence model.

4. The method of claim 3, further comprising obtaining information about at least one of a position and an area occupied by the text obtained from the resource file on the execution screen of the application, and
   wherein the translating comprises applying the information about at least one of the position and area to the artificial intelligence model.

5. The method of claim 1, further comprising identifying a category of the application from the resource file, and
   wherein the translating comprises applying the identified category to the artificial intelligence model.

6. The method of claim 1, wherein the execution screen of the application is generated through an application program interface (API) used by the OS.

7. The method of claim 1, further comprising overlapping a graphic user interface (GUI) for controlling translation of the text on the execution screen of the application.

8. The method of claim 7, wherein the GUI is provided by the OS separately from the application.

9. The method of claim 7, wherein the GUI comprises an object for selecting at least a part of the translated text displayed on the execution screen of the application, and an object for correcting at least a part of the translated text.

10. The method of claim 7, wherein the GUI comprises an object for changing text translated in the second language into a third language.

11. A device for providing translation information of an application, the device comprising:
a display;
a memory; and
a processor configured to control the display and the memory,
wherein the processor is further configured to receive a user input with respect to the application to be executed in the device, obtain a resource file of the application through an operating system (OS) of the device in response to the user input, translate text to be displayed on an execution screen of the application by using an artificial intelligence model and the obtained resource file, generate the execution screen of the application by using the resource file and the translated text, and display the generated execution screen, and
wherein the processor is further configured to translate the text of a first language into a second language by applying at least a part of data in the resource file to the artificial intelligence model trained to translate the text to be displayed on the execution screen of the application.

12. The device of claim 11, wherein the processor is further configured to, in response to the user input, identify whether the application provides a language file of the second language and call the artificial intelligence model when it is determined that the language file of the second language is not provided by the application.

13. The device of claim 11, wherein the processor is further configured to obtain the text of the first language from the resource file and obtain font information of the obtained text, and
wherein the processor is further configured to apply the obtained text and the font information to the artificial intelligence model, for translation.

14. The device of claim 13, wherein the processor is further configured to obtain information about at least one of a position and an area occupied by the text obtained from the resource file on the execution screen of the application, and
the processor is further configured to apply the information about at least one of the position and area to the artificial intelligence model, for translation.

15. A computer-readable recording medium having recorded thereon a program for executing the method of claim 1.

* * * * *